US012793152B2

(12) United States Patent
Zhou

(10) Patent No.: US 12,793,152 B2
(45) Date of Patent: Nov. 10, 2026

(54) METHOD AND SYSTEM FOR ENABLING THE TRANSFER OF DOMAIN

(71) Applicant: D3SERVE LABS INC, Sunnyvale, CA (US)

(72) Inventor: Zainan Zhou, Sunnyvale, CA (US)

(73) Assignee: D3SERVE LABS INC, Sunnyvale, CA (US)

( * ) Notice: Subject to any disclaimer, the term of this patent is extended or adjusted under 35 U.S.C. 154(b) by 0 days.

(21) Appl. No.: 18/978,071

(22) Filed: Dec. 12, 2024

(65) Prior Publication Data

US 2025/0191093 A1 Jun. 12, 2025

Related U.S. Application Data

(60) Provisional application No. 63/609,298, filed on Dec. 12, 2023.

(51) Int. Cl.
*G06Q 50/18* (2012.01)
*G06Q 20/38* (2012.01)

(52) U.S. Cl.
CPC ........... *G06Q 50/18* (2013.01); *G06Q 20/389* (2013.01)

(58) Field of Classification Search
None
See application file for complete search history.

(56) References Cited

U.S. PATENT DOCUMENTS 8,769,655 B2 7/2014 Gould et al.
8,904,519 B2 12/2014 Essawi et al.
(Continued)

FOREIGN PATENT DOCUMENTS

WO WO-2024240887 A1 * 11/2024 ........... H04L 9/3239

OTHER PUBLICATIONS

Allemann, Andrew, "Unstoppable Domains and CNNIC get blockchain patents", Domain Name Wire, Jan. 17, 2023, webpage, https://domainnamewire.com/2023/01/17/unstoppable-domains-and-cnnic-get-blockchain-patents/.

(Continued)

*Primary Examiner* — Paul S Schwarzenberg
(74) *Attorney, Agent, or Firm* — Jacob M. Ward; Ward Law Office LLC

(57) ABSTRACT

A method and system enable the transfer of domain name beneficiary-ship without requiring pre-permission or pre-facilitation by registrars or registries, while decoupling transfer of control from mandatory information collection requirements. The system employs an identification and validation module using blockchain technology to authenticate transfer requests and verify domain ownership. A ledger module records current beneficiaries and enables direct transfers between parties, while a data storage module maintains resource records and regulatory compliance. The system includes processes for managing domain modifications and facilitating beneficiary-ship transfers independently of Contact Information Collection and Verification requirements. Additional features include a beneficiary-ship transfers facilitating module for domain management, collective authorization capabilities, fractional ownership options, and bundle transfer functionality. The system enhances traditional domain management by providing faster settlements, increased liquidity, and improved security while maintaining compliance with mandatory information collection requirements.

20 Claims, 7 Drawing Sheets

(56) References Cited

U.S. PATENT DOCUMENTS

| | | | | |
|---|---|---|---|---|
| 10,862,855 | B1 | 12/2020 | Kaliski, Jr. et al. | |
| 11,558,343 | B2 | 1/2023 | Zeng et al. | |
| 11,558,344 | B1 | 1/2023 | Pezeshki et al. | |
| 11,720,552 | B2 | 8/2023 | Kasimov et al. | |
| 11,797,655 | B1 | 10/2023 | Kaizer et al. | |
| 11,876,774 | B2 | 1/2024 | Pezeshki et al. | |
| 12,147,978 | B2 | 11/2024 | Gauvreau, Jr. | |
| 12,184,604 | B2 * | 12/2024 | DeLuca | H04L 9/3247 |
| 2020/0328883 | A1 * | 10/2020 | Kaizer | H04L 61/4511 |
| 2023/0171225 | A1 * | 6/2023 | Pezeshki | H04L 9/3247<br>709/245 |
| 2023/0252431 | A1 * | 8/2023 | Mecci | G06Q 50/184<br>705/44 |
| 2024/0372827 | A1 * | 11/2024 | Hsu | H04L 61/3025 |

OTHER PUBLICATIONS

Written Opinion of the International Searching Authority dated Feb. 7, 2025.

* cited by examiner

METHOD AND SYSTEM FOR ENABLING THE TRANSFER OF DOMAIN

CROSS-REFERENCE TO RELATED APPLICATIONS

This application claims the benefit of U.S. Provisional Application No. 63/609,298, filed on Dec. 12, 2023. The entire disclosure of the above application is hereby incorporated herein by reference.

FIELD

The present technology relates to domain name registration and management systems, and, more particularly, to methods and systems for enabling the transfer of domain name beneficiary-ship.

INTRODUCTION

This section provides background information related to the present disclosure which is not necessarily prior art.

The Domain Name System (DNS) is a fundamental naming system for computer resources connected to networks, allowing users to reference resources using human-friendly identifiers rather than complex numerical addresses. This system enables users to access websites using memorable domain names instead of requiring them to memorize specific Internet Protocol (IP) addresses.

Traditionally, authorizing the use or management of certain digital assets such as domain names has been coupled with the authorization of transfer of the ownership or beneficiary-ship. The management and execution of the domain name system has been centralized through domain name registrars who act as controlling entities for registration, record updating, transfer, and hosting of domain names. This centralized approach can lead to potential points of failure and may not always serve the best interests of the broader community.

In the context of DNS, the Internet Corporation for Assigned Names and Numbers (ICANN) has established strict requirements for registrars regarding the collection, validation, storage, retention, and query-ability of information about Registered Name Holders. These requirements mandate that registrars must either verify applicable contact information manually or suspend registration if they do not receive affirmative responses from Registered Name Holders.

Current domain transfer processes require verification of domain ownership through the registry of the top-level domain (TLD) or its registrar. The transferring party must typically login to the registry or registrar's computer system to verify their eligibility, which often involves creating an account and completing Contact Information Collection and Verification (CICV) requirements, such as Know-Your-Customer or KYC requirements.

The emergence of blockchain technology has introduced new possibilities for permissionlessly creating accounts and verifying asset ownership without traditional intermediaries like registries or registrars, while preventing double-spending which could result in "domain transfer fraud." However, existing blockchain-based domain name systems still face challenges in integrating with traditional DNS infrastructure while maintaining compliance with regulatory requirements.

Traditional database-based domain name registrars often require complex and time-consuming processes for domain transfers, which can result in delayed settlements and reduced liquidity in the domain name market. These systems typically rely on centralized services provided by the administering registrar, limiting the flexibility and efficiency of domain management. These transfers may be further delayed if the parties also desire to transfer the domain name from one registrar to another, extending the verification period and administrative delays.

The conventional coupling of domain management authorization with ownership transfer authorization can create unnecessary friction in domain name transactions, particularly when dealing with mandatory information collection requirements.

More recent blockchain-based solutions for domain management also present certain challenges. For example, U.S. Patent Appl. Pub. No. 20240095733 titled "BLOCKCHAIN-BASED DOMAIN NAME REGISTRAR AND MANAGEMENT SYSTEM," assigned to 3DNS, INC, and filed on Jun. 22, 2023, discloses a blockchain-based domain name registrar system that converts domain names and DNS records into on-chain assets stored on a blockchain.

While this publication addresses certain aspects of blockchain-based domain management, it maintains traditional requirements for mandatory information collection and pre-facilitation by registrars, requiring users to verify domain ownership through conventional means and complete CICV practices.

It has also been recognized that this blockchain-based approach undesirably still relies on centralized control through registrars for domain transfers and management, perpetuating unnecessary friction in domain name transactions and failing to fully decouple domain management authorization from ownership transfer authorization. These limitations also create inefficiencies in domain transfers and reduce liquidity in the domain name market, highlighting the need for a more streamlined approach that enables transfer of domain beneficiary-ship without requiring pre-permission or pre-facilitation by registrars or registries while maintaining compliance with mandatory information collection requirements.

There is a continuing need for a domain management method and system that enables efficient transfer of domain beneficiary-ship without requiring pre-permission or pre-facilitation by registrars or registries. Desirably, such a method and system would maintain compliance with mandatory information collection requirements while providing enhanced security, reduced transaction times, and improved liquidity for domain name assets.

SUMMARY

In concordance with the instant disclosure, a domain management method and system that enables efficient transfer of domain beneficiary-ship without requiring pre-permission or pre-facilitation by registrars or registries, and which maintains compliance with mandatory information collection requirements while providing enhanced security, reduced transaction times, and improved liquidity for domain name assets, has surprisingly been discovered.

The present technology includes methods and systems that relate to enabling the transfer of domain name beneficiary-ship without requiring pre-permission or pre-facilitation by domain registrars or registries while maintaining compliance with mandatory information collection requirements. In particular, the present technology involves a novel use of blockchain or the general scheme of identity and asset validation to provide capability of decoupling pre-permission and facilitation by registrar and registry when transferring a domain.

In one embodiment, a system for facilitating efficient transfer of domain beneficiary-ship includes one or more hardware processors configured by machine-readable instructions. The system includes an identification and validation module configured to authenticate the identity of request initiators and validate request legitimacy based on timing, sequence, and authority. A ledger module is configured to record identifiers of current beneficiaries for specific domain names and enable direct transfers of beneficiary-ship between parties without requiring approval from domain registrars or registries. A data storage module is configured to store resource record sets for domain names and enforce contractual or legal obligations requiring specific actions or information from beneficiaries before allowing modifications. A domain modification request processing module is configured to receive and independently verify modification requests, confirm compliance with prerequisites (e.g., there is a prerequisite by ICANN for contact information collection and verification), and execute verified modifications upon completion of prerequisites, while facilitating beneficiary-ship transfers without requiring compliance verification for resource record set modifications.

In another embodiment, a method for facilitating efficient transfer of domain beneficiary-ship includes a step of authenticating, by an identification and validation module, the identity of request initiators and validating request legitimacy based on timing, sequence, and authority. The method includes a step of recording, by a ledger module, identifiers of current beneficiaries for specific domain names and enabling direct transfers of beneficiary-ship between parties without requiring approval from domain registrars or registries. The method further includes a step of storing, by a data storage module, resource record sets for domain names and enforcing contractual or legal obligations requiring specific actions or information from beneficiaries before allowing modifications. Additionally, the method includes steps of receiving and independently verifying modification requests, a step of confirming compliance with prerequisites, a step of executing verified modifications upon completion of prerequisites, and a step of facilitating beneficiary-ship transfers without requiring compliance verification for resource record set modifications.

In a further embodiment, the identification and validation scheme involves asymmetric cryptography implemented on a blockchain system. The ledger system may be implemented on an Ethereum or Ethereum Virtual Machine (EVM) compatible blockchain, enabling features such as bundling multiple domains into a single asset for all-or-nothing transactions and fractionalizing domain beneficiary-ship into shares owned by various beneficiaries. The system may also include functionality for multiple parties to collectively authorize domain transfers within a single transaction and incorporate a marketplace for facilitating domain sales between buyers and sellers.

In an exemplary embodiment, the present disclosure relates to a method and system for enabling a transfer of a domain without pre-permission or pre-facilitation by a registrar or a registry, and more particularly, a method decoupling transfer of control of domain beneficiary from mandatory information collection such as Contact Information Collection and Verification (CICV) or other actions required for managing the domains. As non-limiting examples, the CICV may refer to registration data access protocol, WHOIS, or Know-Your-Customer (KYC) requirements.

A method for facilitating a transfer of a domain beneficiary-ship is provided that may include, for example, an identification and validation scheme, a ledger system, employing the identification and validation scheme, a data storage system, a process for managing domain modification requests, and a process for facilitating the transfer of beneficiary-ship of a domain. The identification and validation scheme may authenticate the identity of a request initiator, validate the legitimacy of a request, considering its timing, sequence, and the authority of the request initiator. The ledger system may record the identifier of the current beneficiary for a specific domain name and enable direct transfers of beneficiary-ship between parties, eliminating the need for approval or intervention from domain registrars or registries.

For example, the data storage system may store resource record sets pertinent to a domain name, and operating under contractual or legal obligations, necessitate specific actions or information from a beneficiary (beyond mere identification and validation of requests) before allowing any alterations to the domain's resource record sets. The process for managing domain modification request may include receiving a request to modify domain resource record sets issued by an individual or entity identified as the beneficiary via the identification scheme, and independently authenticating the request without reliance on confirmations or facilitations from registrars or registries.

The process for the domain modification request may include assessment and confirmation of compliance with all prerequisites for modifying resource record sets; initiating steps to meet these prerequisites, such as demanding specific actions or information, if they are not already satisfied, and execution of the requested modifications to the domain's resource record sets, contingent on successful verification and completion of all prerequisites. The process for facilitating the transfer of beneficiary-ship of a domain does not necessitate confirming compliance with the prerequisites set for modifying resource record sets.

In certain examples, the identification and validation scheme may include asymmetric cryptography. The ledger system may include a blockchain. In particular, the ledger system may include an Ethereum or an Ethereum Virtual Machine (EVM) compatible blockchain. A blockchain ledger may facilitate a bundling of multiple domains into a single asset, which is transferred in its entirety in an all-or-nothing transaction, ensuring the atomicity of the bundle throughout the transfer process. Furthermore, the beneficiary-ship of one or more domains may be fractionalized into shares, each owned by various beneficiaries. Upon the execution of a transfer, the proceeds may be proportionally distributed among these multiple beneficiaries.

The method may allow multiple parties to collectively authorize the transfer of one or several domains within a single transaction, enhancing the flexibility and collaborative potential of domain management. A marketplace may also enable a buyer to find a seller, or vice versa, and facilitate the execution of a domain sale using this blockchain-based method. This marketplace may accommodate transactions involving one or multiple parties and charges a fee for the facilitation of these transactions.

The disclosure may provide a sophisticated framework for the decentralized and secure management and transfer of domain ownership, significantly reducing the dependency on traditional domain registrars and registries and enhancing the efficiency and flexibility of domain transactions.

In one example, a domain ownership may be verified at a registrar level. For example, where a registrar uses a smart contract on the Ethereum blockchain to store and verify the current beneficiary of a domain. This process requires no facilitation or pre-permission by a registrar or registry. This may also include (1) collective authorization for transfer or management, (2) fractional ownership, (3) bundle transfer functionality and (4) a marketplace for domain transactions.

In another example, the domain ownership may be verified at a registry level. For example, where the responsibility of verifying domain ownership and managing domain modification requests is shifted from a registrar to a registry. This example also utilizes a smart contract on the Ethereum blockchain. This example may include (1) blockchain-based ownership verification, (2) user information database, (3) domain beneficiary request process, a (4) transfer of domain name beneficiary-ship, and (5) managing domain modification requests at the registry level.

In a further example, embodiment, the disclosure may include a grantor-trustee model for domain management, where a trustee manages domain related activities on behalf of one or multiple grantors. This may include for example, (1) establishment of grantor-trustee relationship, (2) trustee as the interface with registrar, (3) use of DomainNFT as deed, (4) verification and authentication process, (5) transfer of beneficiary-ship without changing trustee, and (6) ceasing the use of trustee (it should be appreciated that the trustee served as the contact information provider and compliance provider in such case).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 3:
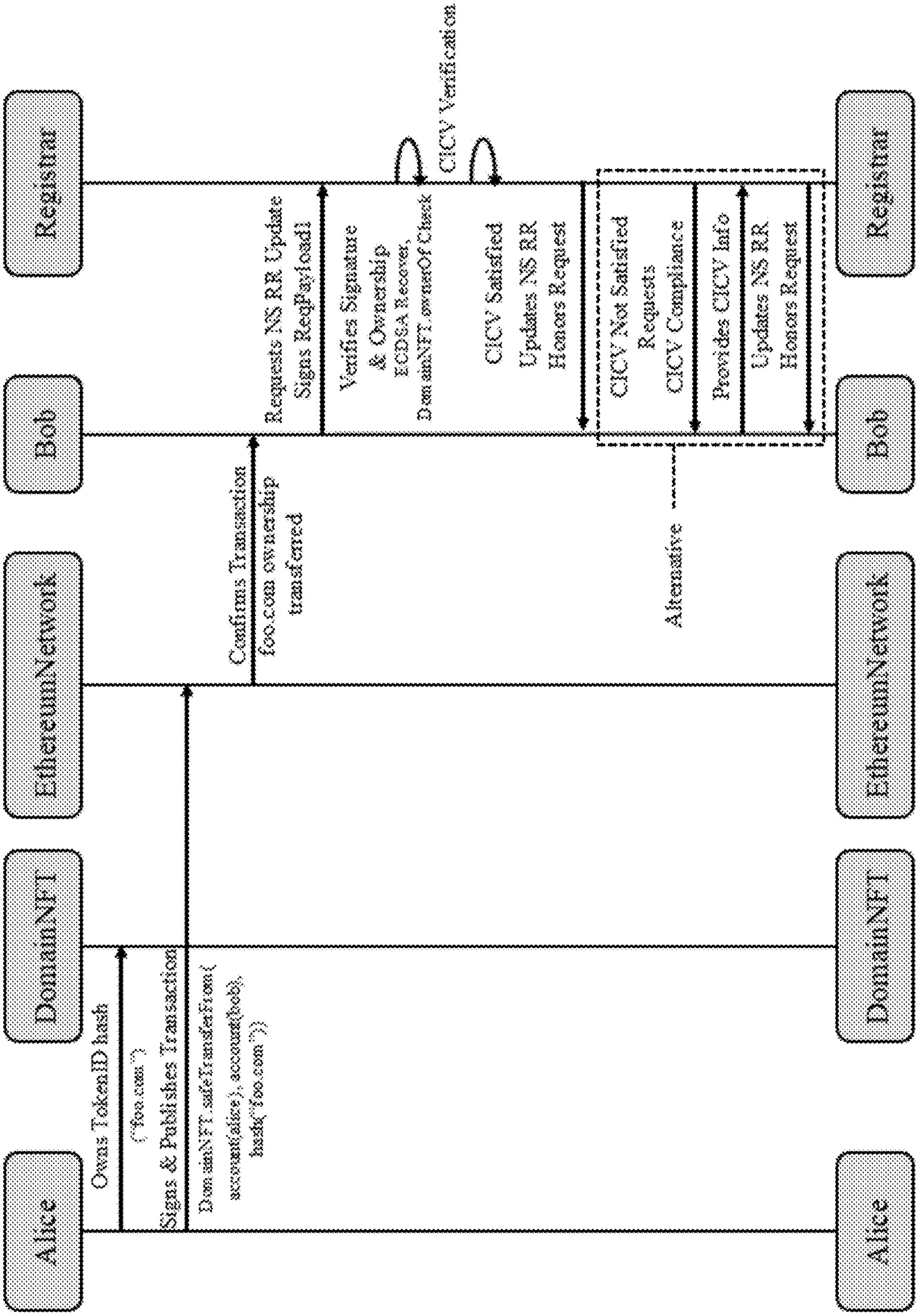

FIG. 3 is a diagram illustrating an implementation of the system and method according to one embodiment of the present disclosure, and involving a verification of a domain ownership at a registrar level, where a first user owns a domain represented by a TokenID in the DomainNFT smart contract and initiates a transfer to a second user by signing and publishing an Ethereum transaction using DomainNFT-.safeTransferFrom and, once confirmed, the second user becomes the new owner, and when the second user requests an NS RR update, they sign a request payload that the registrar verifies through ECDSA recovery (or other public key authentications and/or other type of blockchains) and DomainNFT.ownerOf checks, and then the registrar performs CICV verification and, if satisfied, the request is honored, and, if not satisfied, CICV compliance is requested before proceeding.

Figure 4:
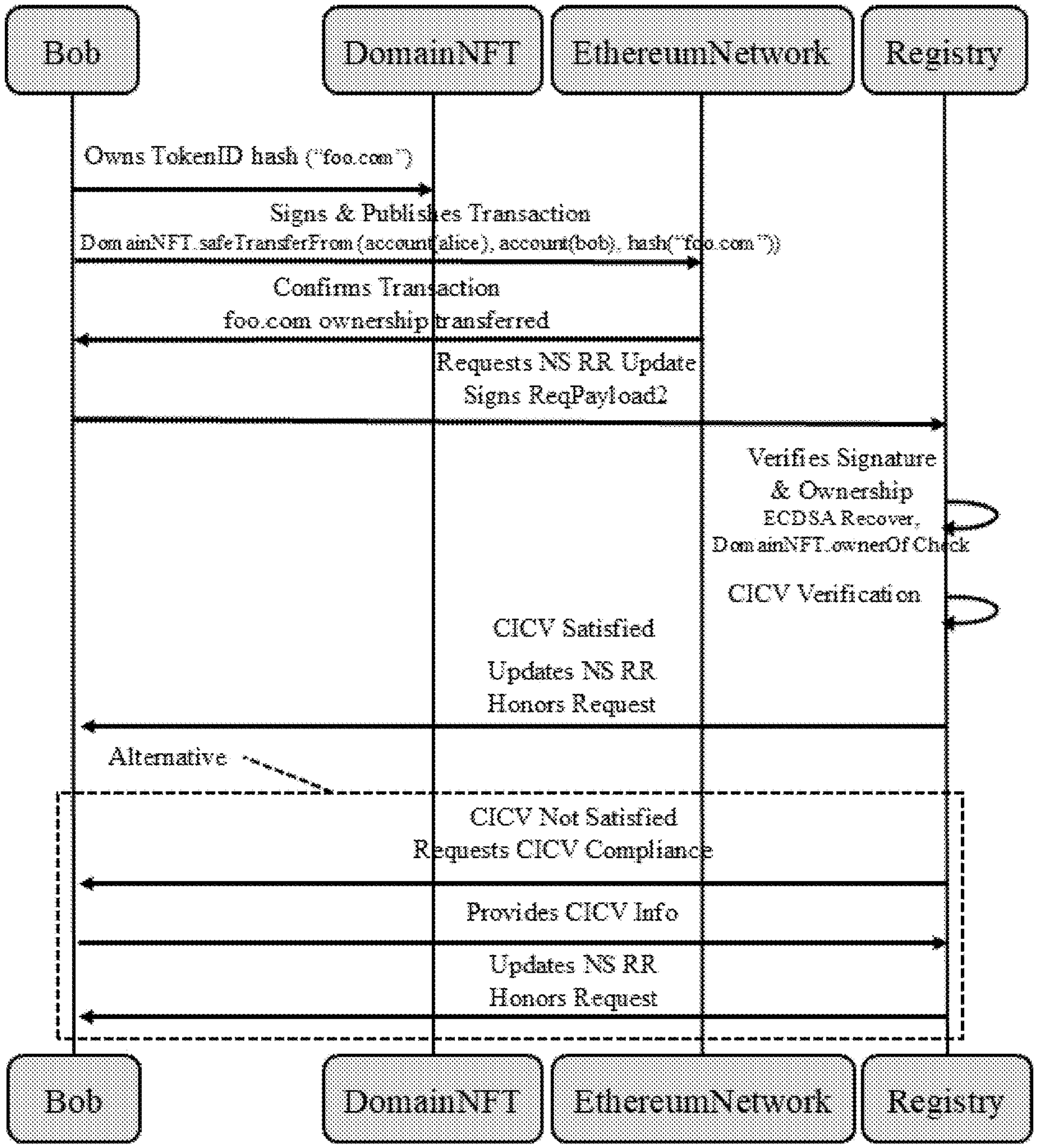

FIG. 4 is a diagram illustrating an implementation of the system and method according to another embodiment of the present disclosure, with verification occurring at the registry level rather than registrar level, where the domain owner signs and publishes a transfer transaction through DomainNFT.safeTransferFrom, and when requesting NS RR updates, the owner signs a payload that the registry verifies through ECDSA recovery and DomainNFT.ownerOf checks, and the registry then performs CICV verification and either honors the request if CICV is satisfied or requests compliance if not.

Figure 5:
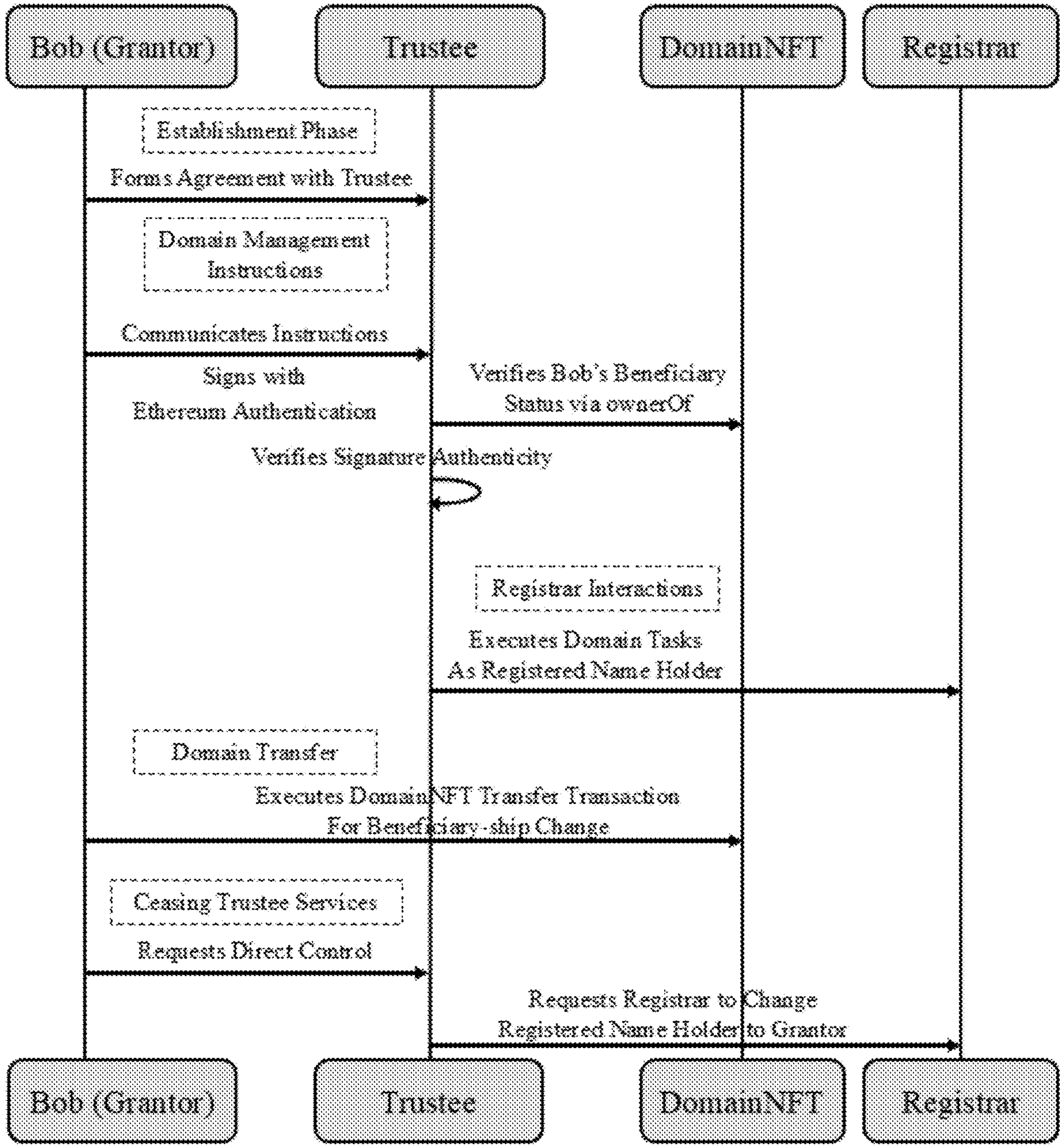

FIG. 5 is a diagram illustrating an implementation of the system and method according to a further embodiment of the present disclosure, and involving a grantor-trustee model and relationship where the grantor first establishes an agreement with a trustee and, for domain management, the grantor communicates instructions signed with Ethereum authentication, which the trustee verifies along with the grantor's beneficiary status via DomainNFT.ownerOf, and the trustee, acting as the registered name holder, then executes domain tasks with the registrar, with this model allowing for domain transfers through DomainNFT transactions while maintaining the trustee relationship, and providing an option for the grantor to cease trustee services by requesting direct control.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology improves the efficiency and security of domain name transfers by decoupling the transfer of domain beneficiary-ship from mandatory information collection requirements while maintaining regulatory compliance. The technology enhances the traditional domain name system by leveraging blockchain technology to enable faster settlements, increased liquidity, and reduced friction in domain name transactions. It improves upon conventional centralized systems by eliminating the need for pre-permission or pre-facilitation by registrars or registries during transfers, while preserving the ability to verify domain ownership and maintain compliance with CICV requirements. The technology further improves domain management by introducing a grantor-trustee model that enhances flexibility and security in domain administration, allowing for collective authorization, fractional ownership, and bundle transfer capabilities.

Figure 1A:
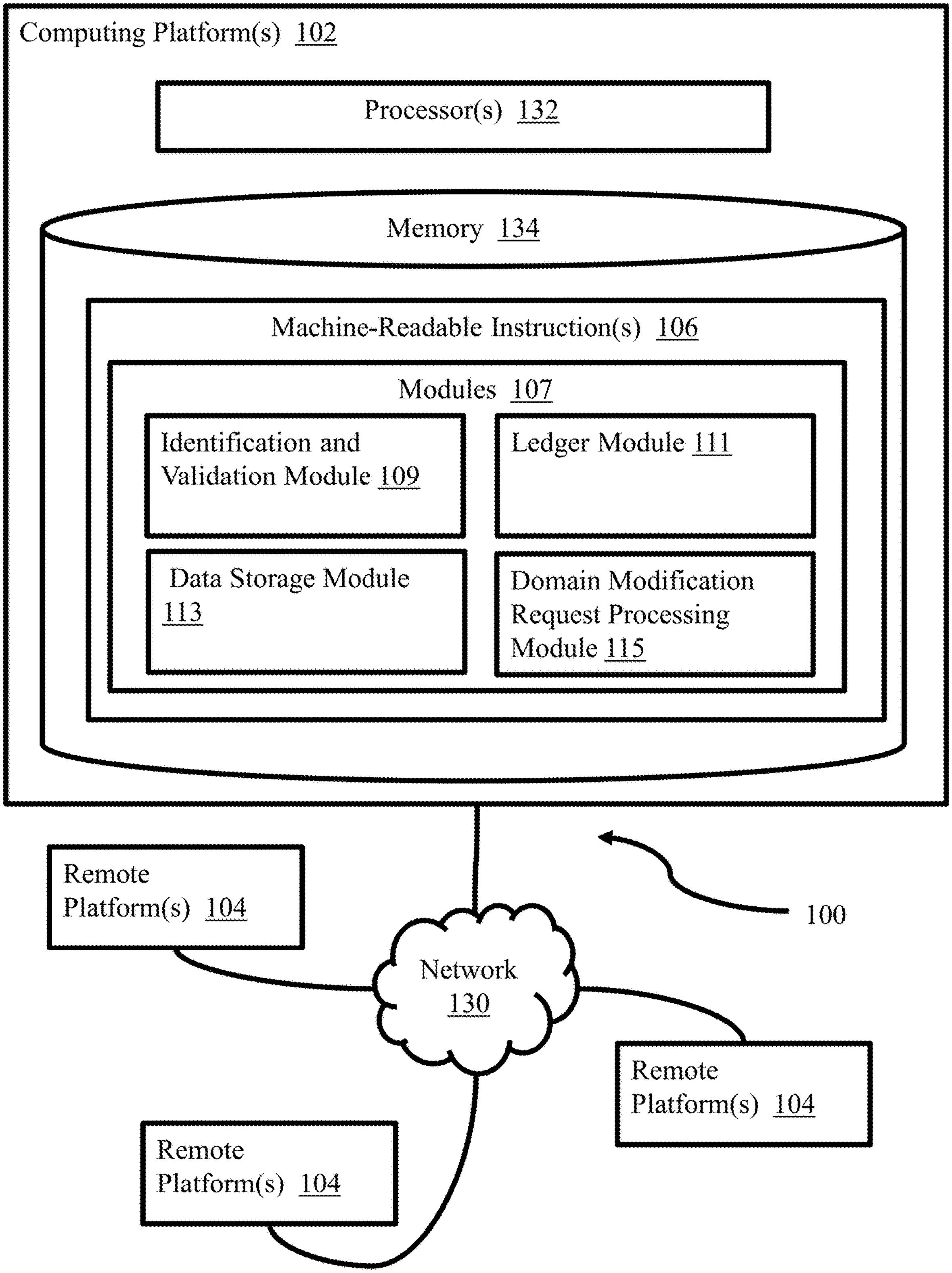
FIG. 1A is a schematic diagram illustrating a system configured for facilitating efficient transfer of domain beneficiary-ship.
Figure 1B:
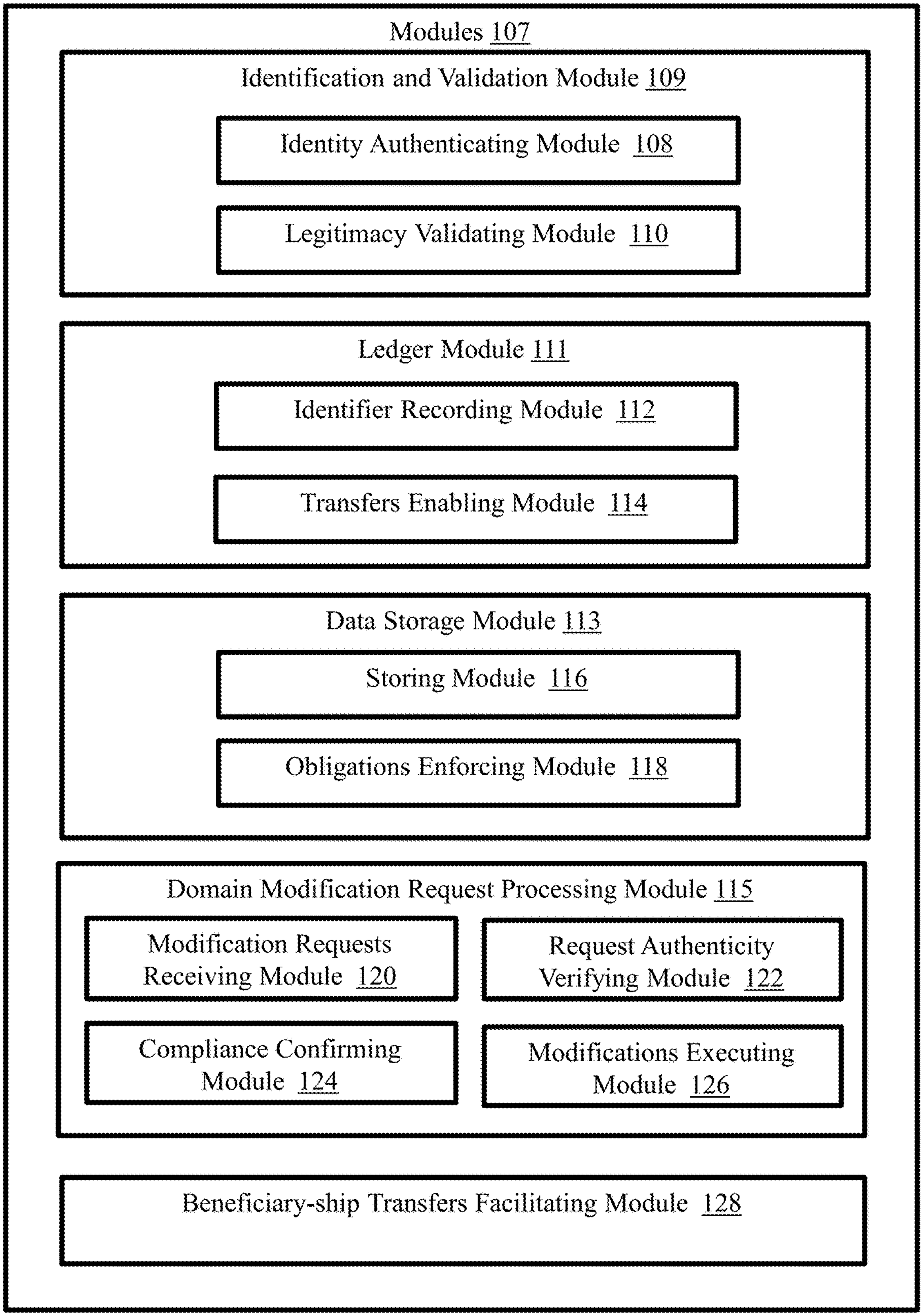
FIG. 1B is a schematic diagram illustrating additional modules of the system shown in FIG. 1A, and also configured for facilitating efficient transfer of domain beneficiary-ship.

As shown in FIGS. 1A and 1B, a system 100 is provided that enables efficient transfer of domain beneficiary-ship without requiring pre-permission from registrars or registries while maintaining compliance with mandatory information collection requirements. The system 100 includes at least one computing platform 102, which in turn includes at least one processor 132 and at least one memory 134 as set forth further herein, and as shown in FIG. 1A. The system 100 may be provided with a modular architecture, for example, which enables flexible system operation and maintenance. Such an implementation may support future enhancements while preserving core functionality, as described further herein.

The processor 132 in each computing platform 102 may be implemented as a general-purpose processor, special purpose computer, microprocessor, DSP, FPGA, or ASIC, as non-limiting examples. The processor 132 executes instructions to manage communication resources and process domain-related transactions in accordance with the method of the present disclosure, for example, as set forth in FIGS. 2A and 2B. The processor architecture also may support distributed processing for scalable system operation.

Returning to FIG. 1A, the memory 134 of the system 100 is in communication with the processors 132 and stores the machine-readable executable instructions 106 for domain management operations. The memory 134 may be provided in the form of a non-transitory computer-readable medium, for example, on which the instructions 106 are tangibly embodied. As nonlimiting examples, the memory 134 may include RAM, ROM, magnetic storage, optical storage, or other suitable storage technologies. The memory 134 maintains system state and enables persistent storage of transaction records, as described further herein.

As also shown in FIG. 1A, the system 100 further includes one or more computing platforms 102 that are communicably coupled with one or more remote platforms 104. The system 100 allows various applicable types of users, as described further herein, to access the computing platforms 102 of the system 100 through one or more remote platforms 104 while maintaining security and compliance standards.

Each of the computing platforms 102 and the remote platforms 104 may be placed in communication via a networked environment 130, for example. The networked environment 130 may enable communication between the computing platform 102 and the remote platforms 104 through various connection types including, as non-limiting examples, radio access networks, LANs, WANs, and WLANs. The computing platform 102 and the remote platforms 104 may include smartphones, tablets, laptops, desktop computers, servers, public or private cloud computing platforms, or IoT devices connected through wireless or wired connections, as various non-limiting examples. In other embodiments, the computing platform 102 and the remote platforms 104 may include web servers, mail servers, application servers, etc. According to certain embodiments, the computing platform 102 and the remote platforms 104 may be standalone servers, networked servers, or an array of servers. A skilled artisan can also select other suitable types of hardware and networking for the computing platform 102 and the remote platforms 104, including those particularly suitable for use in relation to the domain management and transfer technology contemplated and described herein, as desired. The networked environment ensures reliable communication between these various system components, in operation.

In particular, the at least one computing platform 102 of the present disclosure is configured through modules 107 of the machine-readable instructions 106 to implement various functional systems and subsystems. The machine-readable instructions 106 in the form of the modules 107 may include, as non-limiting examples, an identification and validation module 109, a ledger module 111, a data storage module 113, and a domain modification request processing module 115. Each of these modules 107 may be especially adapted for implementation of the method 200, for example, as described further herein.

It should be further appreciated that the identification and validation module 109, the ledger module 111, the data storage module 113, and the domain modification request processing module 115 may also be further defined by additional ones of the modules 107, as shown in FIG. 1B. The modules 107 work together to enable secure domain transfers and management.

The identification and validation module 109 may include an identity authenticating module 108 and a legitimacy validating module 110, for example, as shown in FIG. 1B. The identity authenticating module 108 may be configured to authenticate request initiator identities as part of the identification and validation module 109, for example, implemented via a DomainNFT smart contract on an Ethereum blockchain. The legitimacy validating module 110 may also be configured to validate request legitimacy based on timing, sequence, and authority parameters, as non-limiting examples. One of ordinary skill in the art may also select other suitable types of modules and functionality for inclusion within the identification and validation module 109 within the scope of the present disclosure, as desired.

With further reference to FIG. 1B, the ledger module 111 may also be further defined by an identifier recording module 112 and a transfers enabling module 114. The identifier recording module 112 may be configured to maintain records of current beneficiaries for specific domain names and enable tracking of ownership changes. The transfers enabling module 114 may be configured to facilitate direct transfers of beneficiary-ship between parties without requiring registrar or registry approval. A skilled artisan may also select other suitable types of modules and functionality for inclusion within the ledger module 111 within the scope of the present disclosure.

The data storage module 113 may also be further defined by a storing module 116, an obligations enforcing module 118, for example, as shown in FIG. 1B. The storing module 116 may be configured to maintain resource record sets for domain names in a secure database. The obligations enforcing module 118 may ensure compliance with contractual and legal requirements before allowing modifications to domain records. Other suitable types of modules and functionality for inclusion within the data storage module 113 may also be employed, as desired.

With continued reference to FIG. 1B, the domain modification request processing module 115 may also be further defined by a modification requests receiving module 120, a request authenticity verifying module 122, a compliance confirming module 124, and a modifications executing module 126. The modification requests receiving module 120 may be configured to process incoming modification requests from identified initiators through standardized interfaces, for example, via the one or more remote platforms 104 as shown in FIG. 1A. The request authenticity verifying module 122 may be configured to independently verify the request authenticity using cryptographic methods. The compliance confirming module 124 may be configured to confirm prerequisite requirements are met before proceeding with modifications that are being made by the identified initiators. The modifications executing module 126 may be configured to execute the verified modifications upon completion of prerequisites. One of ordinary skill in the art may also select other suitable types of modules and functionality for inclusion within the domain modification request processing module 115 within the scope of the present disclosure, as desired.

The modules 107 may also include a beneficiary-ship transfers facilitating module 128, for example, as shown in FIG. 1B. The beneficiary-ship transfers facilitating module 128 may be configured to facilitate beneficiary-ship transfers without requiring compliance verification for resource record set modifications, upon completion of the activity associated with the other modules 107 as set forth hereinabove. Other suitable types of modules and functionality may also be employed with the beneficiary-ship transfers facilitating module 128 within the scope of the present disclosure.

It should also be appreciated that the system 100 of the present disclosure may also be provided with a variety of other types of the modules 107, not shown, which can be implemented separately or as part of any of the other modules 107 described herein. These other types of the modules 107 also be helpful to enable secure domain transfers and management in accordance with the method 200, and under more particular circumstances, as described further hereinbelow.

In one embodiment, the system 100 may have a multi-signature contract wallet module, like Gnosis Safe, which enables collective authorization of domain transfers. This permits a group of authorized parties to jointly approve domain modifications through a single transaction. The multi-signature functionality also may provide secure group control over domain assets.

In another embodiment, the system 100 may include an ERC20 token contract module. This module may be configured to implement fractional ownership of individual or bundled domains. In this example, a token represents proportional domain ownership with built-in governance mechanisms. The fractional ownership system enables automated distribution of proceeds among token holders.

In a further embodiment, the system 100 may include a bundle transfer functionality module. This module may be configured to group multiple domains for atomic transfers. In this module, a locking mechanism may be employed to prevent individual transfers of bundled domains during group operations. The bundle transfer functionality module may thereby maintain relationship tracking between bundle identifiers and component domains.

In an additional embodiment, the system 100 may include a marketplace component module. This module may be configured to connect buyers and sellers for domain transactions. This module may also have a listing system that is configured to enable offer submission and transaction execution with integrated fee collection. The marketplace component module may ensure all transfers are executed through a DomainNFT smart contract for ownership verification, for example.

In yet another embodiment, the system 100 may have a security module. The security module is configured to implement comprehensive transaction validation including nonce values, timestamps, and blockchain chainIDs, as non-limiting example. The security module may also provide a validation process that is configured to prevent replay attacks and ensure transaction authenticity. The security module thereby implements measures that maintain system integrity across all operations.

In yet a further embodiment, the system 100 includes a verification process module. The verification process module may be configured to process domain modification requests that have multiple validation steps. The verification process module may include a signature verification, for example, which may use ECDSA recovery to authenticate requests. The verification process module may also employ ownership confirmation system checks DomainNFT.ownerOf records and thereby validate CICV requirements. Authentication of requests may also include the use of encryption algorithms such as RSA, EdDSA, DH, or ECDH. It should be appreciated that authentication of requests may also include the use of Post Quantum Cryptography (PQC) in accordance with evolving industry standards.

In yet an additional embodiment, the system 100 includes a database module, such as a MySQL database. The database module may be configured to store user contact information including email addresses, phone numbers, and mailing addresses. The database module may use Ethereum public addresses as user identifiers for CICV compliance. The database module may also be configured to maintain separation between user data and transfer processes.

In another embodiment, the system 100 includes a registration system module. The registration system module may be configured to support both public and private options for domain ownership, for example. The public registration makes ownership information available through standard interfaces, for example, via the one or more remote platforms 104, shown in FIG. 1A. The private registration masks certain details through registrar proxies while maintaining system functionality.

In a further embodiment, the system 100 includes a logging system module. The logging system module may be configured to maintain comprehensive records of domain-related transactions and modifications. The maintenance of this transaction history may further enable verification of ownership transfers and system operations. Such an audit trail provides transparency and supports compliance requirements.

In an additional embodiment, the system 100 includes an error handling system module. This module may be configured to ensure stability during exceptional conditions. For example, a typical recovery process may include transaction rollback capabilities and automated retry procedures. The error management system may therefore permit for data consistency across operations.

In yet another embodiment, the system 100 includes a backup system module. The backup system model may be configured to ensure data persistence across both blockchain and traditional databases. This module may also have a recovery procedure that enables system restoration in case of failures. As with the error management system module, such backup architecture permits for the maintaining of system reliability and data integrity.

Figure 2A:
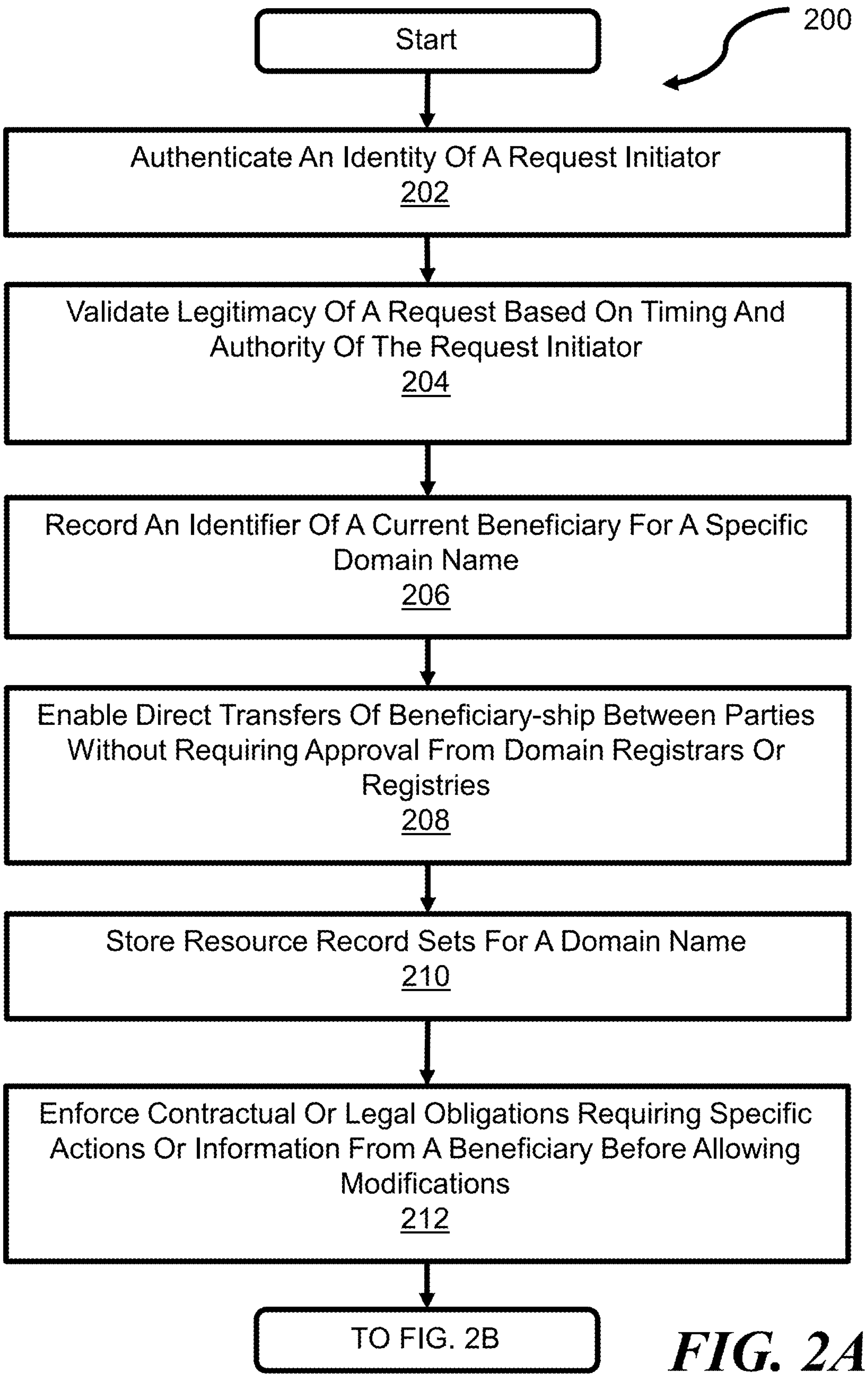
FIG. 2A is a flow chart illustrating a method for facilitating efficient transfer of domain beneficiary-ship.
Figure 2B:
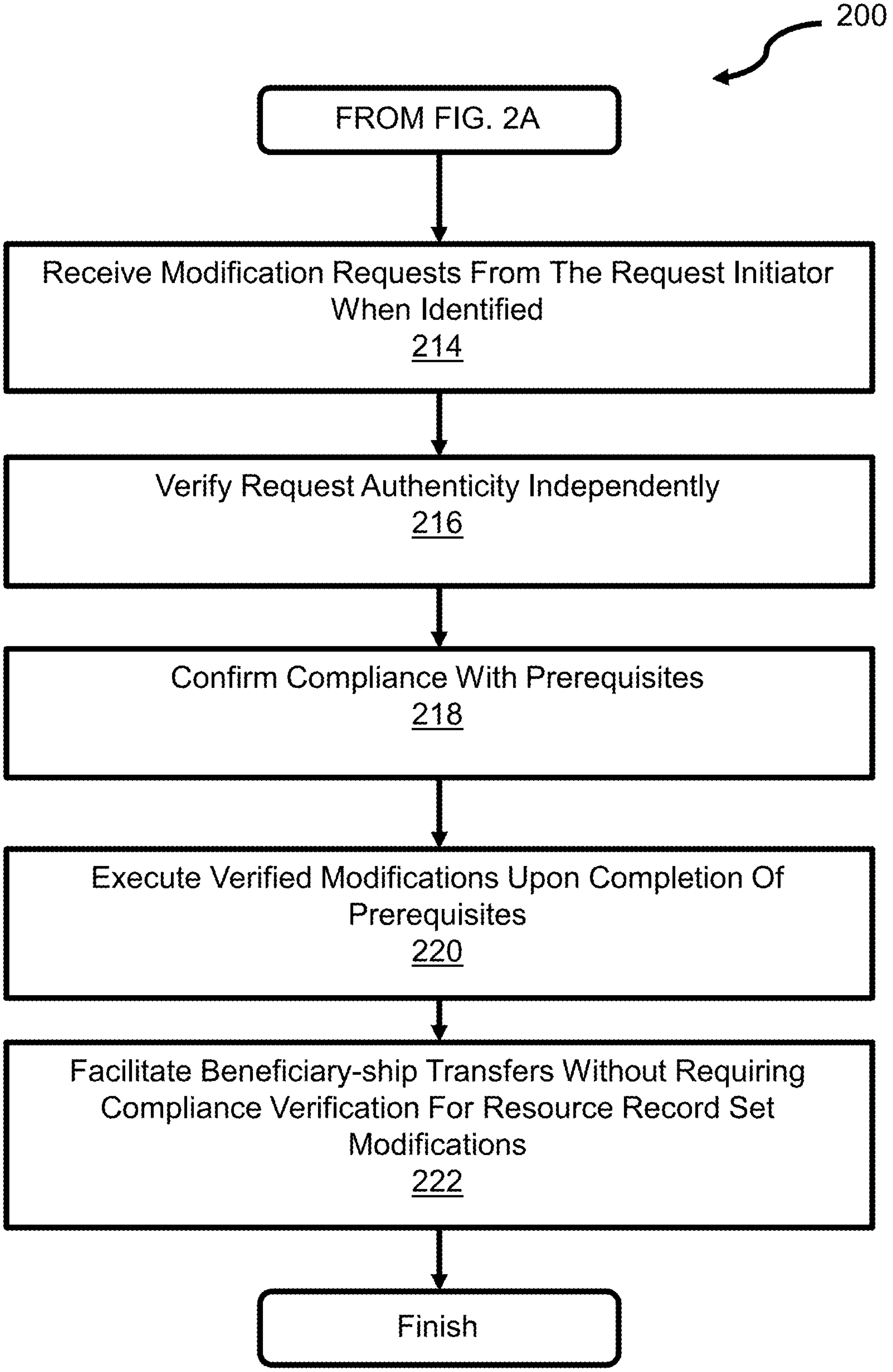
FIG. 2B is a flow chart further illustrating the method for facilitating efficient transfer of domain beneficiary-ship as shown in FIG. 2A.

As shown in FIGS. 2A and 2B, the method 200 of the present disclosure implements domain management operations through a defined workflow. The at least one processor 132 of the system 100 permits for the execution of the method 200 through the machine-readable instructions 106 and the modules 107, for example, as described hereinabove. The method 200 may begin with request initiator authentication and then the method 200 proceeds through validation and other various steps as described below. The method 200 ensures proper sequencing of operations while maintaining security requirements.

Referring to FIG. 2A, the method 200 includes a first step 202 of authenticating a request initiator identity through the identification and validation module, for example, using asymmetric cryptography implemented via a DomainNFT smart contract on the Ethereum blockchain. In a second step 204, the method 200 includes a validating by the identification and validation module of a request legitimacy based on timing, sequence, and authority parameters to ensure secure transaction processing. One of ordinary skill in the art may also select other suitable methods for authenticating in the first step 202, and the validating in the second step 204, consistent with the present disclosure, as desired.

As also shown in FIG. 2A, the method 200 may further include a third step 206, which involves recording an identifier of the current beneficiary for a specific domain name through the ledger module implemented on the blockchain. A fourth step 208 may also be executed by the ledger module, which enables direct transfers of beneficiary-ship between parties without requiring approval from domain registrars or registries, utilizing smart contract functionality to ensure transaction validity. The ledger module may specifically employ Ethereum or an EVM compatible blockchain to facilitate these transfers; although, other suitable forms and types of blockchain technology is also contemplated and considered to be within the scope of the present disclosure.

With continued reference to FIG. 2A, the method 200 may include a fifth step 210 of storing resource record sets for domain names through the data storage module. The data storage module may also be used in a sixth step 212, whereby the method 200 includes an enforcing of contractual and legal obligations requiring specific actions or information from beneficiaries before allowing modifications. Various suitable methods for both the storing of the resource records sets for domain names in the fifth step 210, and the enforcing of obligations from beneficiaries in the sixth step 212 may also be employed, as desired.

Referring now to FIG. 2B, the method 200 may also include a seventh step 214 of receiving modification requests for processing, for example, through the domain modification request processing module, when request initiators are properly identified. The domain modification request processing module may also be used in an eighth step 216 of independently verifying request authenticity, followed by a ninth step 218 that confirms compliance with prerequisites. The domain modification request processing module may further be employed in a tenth step 220, which involves an executing of verified modifications upon completion of prerequisites.

Upon completion of the steps 202-220 as described hereinabove, and as shown in FIGS. 2A and 2B, the method 200 may further advantageously include an eleventh step 222, involving a facilitating of beneficiary-ship transfers without requiring compliance verification for resource record set modifications.

It should be appreciated that the method 200 also may support advanced functionality including bundling multiple domains into a single bundled and transferrable asset through the blockchain-based ledger module. The entirety of the bundled asset transfers executes atomically in a single transaction, ensuring all component domains transfer simultaneously. The system enables fractionalization of domain beneficiary-ship into shares owned by multiple parties, with proportional distribution of proceeds upon transaction execution.

The method 200 may further implement collective authorization capabilities allowing multiple parties to authorize domain transfers within a single transaction through multi-signature contract wallets like Gnosis Safe. The marketplace component may also facilitate, by the method 200, domain sales between buyers and sellers, charging facilitation fees for successful transactions. The marketplace enables listing creation, offer submission, and automated execution of transfers through the DomainNFT smart contract, for example.

The method 200 of the present disclosure may also maintain security through comprehensive transaction validation including nonce values, timestamps, and blockchain chainIDs, as non-limiting examples. These security measures may prevent replay attacks while ensuring transaction authenticity across all operations. The method 200 may further implement error handling mechanisms and automated retry procedures to maintain data consistency throughout the transfer process.

Advantageously, the system 100 and the method 200 of the present disclosures solves the challenges of traditional domain transfer systems by enabling efficient transfers without requiring pre-permission or pre-facilitation from registrars or registries while maintaining compliance with mandatory information collection requirements. The system 100 and the method 200 decouples domain beneficiary-ship transfers from CICV requirements through a blockchain-based system that prevents double-spending and domain transfer fraud, while its grantor-trustee model provides enhanced security and flexibility for domain management.

By implementing smart contracts on the Ethereum blockchain for ownership verification, supporting fractional ownership through ERC20 tokens, and enabling bundle transfers with atomic execution, the invention addresses the limitations of conventional centralized systems that result in delayed settlements and reduced liquidity in the domain name market, while maintaining the ability to enforce contractual obligations and verify domain ownership when required.

EXAMPLES

Example embodiments of the present technology are provided with reference to the several figures enclosed herewith, including FIGS. 3 to 5.

Example 1: Verify Domain Ownership at Registrar Level

In general, as shown in FIG. 3, where the DomainNFT smart contract is employed, the DomainNFT smart contract may implement domain ownership verification and transfer at a registrar level. In this example, a first user may initiate domain transfer by signing an Ethereum transaction to transfer ownership to a second user. A registrar then verifies modification requests through ECDSA recovery and smart contract ownership checks.

More particularly, in FIG. 3 a method for verifying domain ownership at the registrar level using blockchain technology is shown. In this example, a registrar employs an ERC-721 NFT smart contract (DomainNFT) on the Ethereum blockchain to store and verify the current beneficiary of registered domains, with NFT TokenIds defined using the keccak256 hash of the domain name. The system also utilizes a MySQL server to maintain user contact information including email addresses, phone numbers, and mailing addresses, with UserIDs corresponding to Ethereum public addresses.

For domain record updates, the system requires beneficiaries to sign requests using Ethereum's ECDSA signature scheme. The transfer process begins with two parties holding Ethereum EOA accounts—a current owner and an intended recipient. The current owner initiates the transfer by signing an Ethereum blockchain transaction through the ERC-721 contract, publishing it to the network via JSONRPC calls or a local Ethereum client, and paying appropriate gas fees for transaction priority.

Once the Ethereum network confirms and finalizes the transaction, ownership transfers without requiring intervention from registrars or registries. For subsequent domain modifications, the new owner signs request payloads that undergo a multi-step verification process. The registrar performs ECDSA recovery on signed requests and verifies both account recovery and domain ownership through the DomainNFT contract.

The verification process includes CICV compliance checks against the MySQL database. If CICV requirements are not met, the system prompts the user to provide necessary information through a dedicated workflow before reprocessing the request. Successfully verified requests meeting CICV requirements are forwarded to the appropriate registry for execution.

The system implements additional functionality including collective or multi-party authorization through multi-signature contract wallets like Gnosis Safe, enabling multiple parties to jointly authorize transfers. Fractional ownership capabilities are provided through ERC20 token contracts that represent proportional domain ownership, with built-in mechanisms for sale authorization and proceeds distribution.

Bundle transfer functionality allows multiple domains to be transferred atomically through two primary methods: bundling and unbundling. The bundle function verifies token ownership, implements transfer locks, and maintains relationship tracking between bundles and component domains. A complementary unbundle function reverses this process when needed.

A marketplace component facilitates domain transactions by connecting buyers and sellers, enabling listing creation and offer submission. When parties agree on terms, the marketplace executes transfers through the DomainNFT contract while collecting facilitation fees. While basic security measures like nonce values and timestamps are omitted from this example for clarity, production implementations must include comprehensive replay attack prevention and other security considerations.

By way of further example, consistent with this description under Example 1, and as shown in FIG. 3, consider also the following situation:

In the context of ICANN, a registrar uses:

(1) An ERC-721 NFT smart contract, denoted as DomainNFT, on the Ethereum blockchain to store and look up the current beneficiary of a given domain that is registered to it. The NFT TokenId is defined as keccak256 of the domain name.

(2) A MySQL server to store contact information such as emails, phone numbers, and mailing addresses of all its registered users, with the UserID being arbitrary Ethereum public addresses.

When a domain beneficiary requests to update an NS RR or any resource records managed by such registrar, these requests are signed with Ethereum's ECDSA signature scheme.

The following process describes the transfer of domain name beneficiary-ship:

Initially,

Alice and Bob each hold an EOA of Ethereum, denoted as account (alice) and account (bob).

Alice is the current owner of the TokenID hash (foo.com) of the DomainNFT.

Alice signs an Ethereum blockchain transaction of ERC-721 to transfer the domain identified by TokenID=hash ("foo.com") and publishes it to the Ethereum network (e.g., calling a JSONRPC of Infura.io or running her own Ethereum client node), and pays the proper gas fees for priority to be included on the Ethereum blockchain network. This includes an Ethereum Contract Call with the following parameter: DomainNFT-.safeTransferFrom (account(alice), account(bob), hash ("Foo.com")).

When the Ethereum network confirms that such a transaction has been included and finalized, the domain foo.com is now considered owned by Bob.

Note: This process requires no facilitation or pre-permission by a registrar or registry.

The following process describes managing domain modification requests.

Step 1: To request the registrar to change the NS RR for the domain foo.com, its current owner Bob signs the following request payload: ReqPayload1={requester: account (bob), domainNftTokenId: hash("foo.com"), newNS: ["a.ns.bob.test"]}, yielding a signature of Sigl.

Step 2: The registrar takes the request ReqPayLoad1 and conducts an ECDSA recovery of {ReqPayload1, Sig1}, which yields account (recovered).

Step 3: The registrar checks if account (recovered)=account (bob) AND if DomainNFT.owner0f(hash("foo-.com")) matches account(bob).

Step 3.A: If either check fails, reject and discard the request.

Step 3.B: Otherwise, proceed to verify within its MySQL server that Bob, identified by the Ethereum address account (bob), already meets the requirement for CICV.

Step 3.B.1: If such CICV requirements have not been met, prompt Bob to provide information required for CICV by returning a failure indicating such, or, if Bob is using a GUI of this registrar, start the CICV user workflow for Bob and then reprocess the request.

Step 3.B.2: If such CICV requirements have already been met, honor the request by forwarding the NS RRs to the registry of. com.

In addition to the preset steps described above, the following functionalities are added:

Collective Authorization for Transfer or Management:

To allow multiple persons to collectively authorize a transfer or manage a domain, a threshold multi-signature contract wallet is used, such as Gnosis Safe. This wallet is employed to sign and authorize the transfer of a token in the DomainNFT.

Fractional Ownership:

Functionality is added to fractionalize the ownership of a domain. This is achieved by creating a smart contract instance of ERC20 corresponding to a single or bundled domain in DomainNFT. Each share of this ERC20 represents a pro-rata ownership of the domain. A threshold and deadline for proposals are set to meet the requirements for authorizing the domain's sale. When the corresponding domain is sold, the proceeds (less any fees) are returned to the holders of the ERC20s on a pro-rata basis.

Bundle Transfer Functionality:

Two methods are added to DomainNFT for bundle transfer:

function bundle (uint256[] memory tokenIds) public returns (uint256 bundleId): This function verifies that each tokenId in tokenIds is valid and that the caller is the current owner. It sets a lock for each token, preventing individual transfer or burning, allocates a non-colliding bundleId, and saves the relationship between bundleId and tokenIds within the smart contract.

function unbundle(uint256 bundleId) public: This function undoes what bundle does.

Marketplace for Domain Transactions:

A marketplace facilitates transactions by enabling a willing seller of a domain to provide listing information and a willing buyer to submit offer pricing information. When the buyer and seller identify each other and agree on a satisfactory price, the buyer pays the seller the agreed-upon amount. The seller then signs a transaction on the Ethereum blockchain to transfer the domain's beneficiary-ship. The marketplace receives a fee for facilitating this transaction.

Note: For simplicity, other information required to avoid replay attacks, such as nonce, timestamp, or blockchain chainId, are omitted. In a production environment, these and other security measures should be considered and included.

Example 2: Verify Domain Ownership at Registry Level

In general, as shown in FIG. 4, a registry-level verification system maintains a DomainNFT smart contract and verifies ownership and modification requests directly. A registry performs CICV validation while reducing intermediary involvement. The registry-level approach maintains security while streamlining the verification process.

More particularly, the Example 2 in FIG. 4 demonstrates a registry-level approach to domain ownership verification and management. In this implementation, the domain name registry assumes direct responsibility for verifying ownership and managing modification requests through a blockchain-based system. The registry deploys an ERC-721 NFT smart contract (DomainNFT) on the Ethereum blockchain to store and verify current domain beneficiaries, with NFT TokenIds defined using the keccak256 hash of each domain name.

The system maintains a MySQL database to store comprehensive user information including email addresses, phone numbers, and mailing addresses for all domain owners. User identification within the system relies on Ethereum public addresses as unique identifiers, enabling direct correlation between blockchain transactions and user records. The database structure supports efficient CICV verification while maintaining separation between ownership and compliance data.

Domain beneficiaries initiate record updates through signed requests using the Ethereum ECDSA signature scheme. The transfer process mirrors Example 1 in its use of Ethereum blockchain transactions but implements additional safety measures through specialized Contract Calls. Ownership transfer completion requires transaction confirmation and finalization on the Ethereum network.

The registry implements a structured process for managing domain modification requests. When a domain owner initiates an NS RR change, they sign a request payload that includes their account information and domain identifier. The registry processes these requests through ECDSA recovery to verify authenticity and match the recovered signature against stored ownership records.

Request verification follows a multi-step process where the registry first confirms signature validity and ownership status through the DomainNFT.ownerOf function. Failed verifications result in immediate request rejection, while successful verifications proceed to CICV requirement validation. The registry queries registrar records using the owner's Ethereum address to confirm CICV compliance.

If CICV requirements are not satisfied, the system directs owners to complete the necessary verification process through an authorized registrar before reprocessing their request. Successfully validated requests proceed to NS RR updates, with the registry executing the modifications directly. While this example omits certain security details for clarity, production implementations must include nonce values, timestamps, and blockchain chainIds to prevent replay attacks.

The system adheres to established standards, with NS RRs conforming to IETF RFC1034 specifications and hash functions utilizing the Ethereum keccak256 implementation. These standardized components ensure compatibility with existing DNS infrastructure while enabling enhanced functionality through blockchain integration.

By way of further example, consistent with this description under Example 2, and as shown in FIG. 4, consider also the following situation:

In this context, a domain name registry, as opposed to a registrar, undertakes the responsibility of verifying domain ownership and managing domain modification requests. This process involves:

(1) Blockchain-Based Ownership Verification:

The registry utilizes an ERC-721 NFT smart contract, termed DomainNFT, on the Ethereum blockchain. This contract is used to store and look up the current beneficiary of a domain name. The NFT TokenId for each domain is defined as keccak256 of the domain name.

(2) User Information Database:

A database (such as MySQL) is used to store the contact information (emails, phone numbers, mailing addresses) of all domain owners. The UserID in this system corresponds to arbitrary Ethereum public addresses.

(3) Domain Beneficiary Request Process:

To update NS RR or other resource records, a domain beneficiary (current owner) issues a request. This request is signed using Ethereum's ECDSA signature scheme.

(4) Transfer of Domain Name Beneficiary-ship:

Similar to Example 1, the process involves Ethereum blockchain transactions for transferring the domain, with the inclusion of a safeTransferFrom Ethereum Contract Call. The process ensures that once a transaction is confirmed and finalized on the Ethereum network, the domain's ownership is considered transferred.

(5) Managing Domain Modification Requests at the Registry Level:

Step 1: The current domain owner signs a request payload to change the NS RR for their domain. For example, Bob, the owner of foo.com, signs ReqPayload2={requester: account(bob), domainNftTokenId: hash("foo.com"), newNS: ["nsl.registry.example"]}, producing a signature Sig2.

Step 2: The registry takes the request ReqPayload2 and performs an ECDSA recovery of {ReqPayload2, Sig2}, yielding account (recovered).

Step 3: The registry verifies that account(recovered)+account(bob) and checks if DomainNFT.owner0f(hash ("foo.com")) matches account(bob).

Step 3.A: If either check fails, the request is rejected and discarded.

Step 3.B: If the checks pass, the registry then verifies if the CICV requirements have been met by Bob, such as via querying a registrar, identified by the Ethereum address account(bob).

Step 3.B.1: If CICV requirements are unmet, Bob is prompted to provide necessary information or undergo a CICV process, such as via a Registrar, before reprocessing the request.

Step 3.B.2: If CICV requirements are met, the registry honors the request by updating the NS RRs.

Note: For simplicity, details such as nonce, timestamp, or blockchain chainId, necessary for avoiding replay attacks and other security measures, are omitted in this description. In a production environment, these and other security considerations should be included.

Note:

{NS RRs} are defined as IETF RFC1034 hash here in the context of Ethereum refers to keccak256

Example 3: Grantor-Trustee Model for Domain Management

In general, as shown in FIG. 5, a grantor-trustee model enables a trustee to act as an intermediary between grantors and registrars. A trustee verifies grantor status through a DomainNFT smart contract while ensuring compliance with registration requirements. The model provides flexibility in domain management while maintaining security.

More particularly, in FIG. 4 a grantor-trustee model is demonstrated for domain management that integrates blockchain technology with traditional domain administration. The system establishes a framework where a trustee acts on behalf of multiple grantors, interfacing with registrars for domain-related activities while utilizing DomainNFT smart contracts on the Ethereum blockchain as deeds of trust. This model enables efficient management while maintaining security and compliance requirements.

The relationship between grantors and trustees begins with a formal agreement that authorizes the trustee to manage domain names on behalf of the grantors. The trustee serves as the primary point of contact with registrars, appearing as the registered name holder in official records while managing domains for multiple grantors. This structure streamlines communication and administrative processes while maintaining clear lines of authority.

The system employs DomainNFT smart contracts on the Ethereum blockchain to verify domain beneficiary-ship, serving as immutable deeds between grantors and trustees. When grantors need to verify requests to their trustee, they utilize the Ethereum authentication scheme to sign messages, which the trustee then verifies through signature validation and beneficiary status confirmation using the DomainNFT.ownerOf method.

Domain transfers can occur without changing the trustee relationship through DomainNFT transfer transactions executed by the grantor. This capability enables efficient ownership changes while maintaining existing administrative structures. The system also provides flexibility for grantors to terminate the trustee relationship and assume direct control by requesting the trustee to instruct the registrar to update the registered name holder.

The operational process follows a structured workflow beginning with agreement formation between grantor and trustee. Grantors communicate instructions for domain-related tasks using signed messages via the Ethereum authentication scheme, which trustees verify through signature validation and beneficiary status confirmation. The trustee then executes tasks with the registrar while referencing DomainNFT contracts for ownership verification.

For domain transfers between grantors under the same trustee, the system executes DomainNFT transfer transactions while maintaining trustee relationships. When grantors choose to end trustee services, they can initiate a process to assume direct domain control through registrar updates. This flexibility enables efficient transitions between management models while maintaining security and compliance.

The model provides comprehensive domain management capabilities by combining traditional registrar interactions with blockchain-based ownership verification. This integration particularly benefits grantors who prefer delegated management of registrar processes while leveraging blockchain technology for enhanced security and operational efficiency. The system maintains compliance requirements while streamlining administrative processes through trusted intermediaries.

By way of further example, consistent with this description under Example 3, and as shown in FIG. 5, consider also the following situation:

An embodiment referred to as Embodiment C of the present invention is described as follows:

This embodiment introduces a Grantor-Trustee model in domain management. The Trustee, acting on behalf of one or multiple Grantors, interacts with a Registrar for domain-related activities, using DomainNFT on the Ethereum blockchain as the deed of trust.

(1) Establishment of Grantor-Trustee Relationship:

Grantors, such as Bob, enter into a formal agreement with the Trustee. This agreement authorizes the Trustee to manage domain names on behalf of the Grantors.

(2) Trustee as the Interface with Registrar:

The Trustee is the primary point of contact for the Registrar, managing domains for multiple Grantors. In the Registrar's records, the Trustee is listed as the Registered Name Holder.

(3) Use of DomainNFT as Deed:

The Trustee refers to the DomainNFT smart contract on the Ethereum blockchain to verify the current beneficiary-ship of domains. The DomainNFT acts as a deed between the Grantors and the Trustee.

(4) Verification and Authentication Process:

Whenever Bob needs to verify his requests to the Trustee, he uses the Ethereum authentication scheme to sign his messages. The Trustee verifies the authenticity of Bob's requests via this signature and confirms Bob's current beneficiary status by looking up the DomainNFT.owner0F method.

(5) Transfer of Beneficiary-ship without Changing Trustee:

When a Grantor wishes to transfer domain beneficiary-ship while retaining the same Trustee, a DomainNFT transfer transaction must be executed by the Grantor.

(6) Ceasing the Use of Trustee:

A Grantor can choose to stop using the Trustee as an agent and become a direct controller of a domain. This involves the Grantor requesting the Trustee to instruct the Registrar to change the Registered Name Holder to the Grantor.

Step-by-Step Process:

Step 1: A Grantor, like Bob, forms an agreement with the Trustee for domain management.

Step 2: Bob communicates his instructions to the Trustee for any domain-related task, signing his message using the Ethereum authentication scheme.

Step 3: The Trustee verifies the authenticity of Bob's request through his Ethereum signature and confirms his status as the current beneficiary via the DomainNFT.owner0f method.

Step 4: The Trustee, as the Registered Name Holder, then interacts with the Registrar to execute Bob's tasks, referencing DomainNFT for ownership details.

Step 5: If Bob decides to transfer a domain to another Grantor while retaining the same Trustee, he executes a DomainNFT transfer transaction.

Step 6: To cease using the Trustee and take direct control, Bob instructs the Trustee to request the Registrar to change the domain's Registered Name Holder to himself.

Note: This model provides a robust framework for managing domain names through a Trustee, integrating traditional registrar interactions with advanced blockchain-based ownership verification. It caters to Grantors who prefer not to directly handle Registrar processes and those looking to utilize blockchain technology for enhanced security and efficiency in domain management.

In relation to the grantor-trustee model, it should also be appreciated that traditional domain registration can be analogized by way of an NSE example. Under this analogy, domain owners must each establish their own "vault" with registrars, requiring identity verification and CICV information for any transfer—similar to how securities historically required physical movement between vaults with identity verification at each step. The present disclosure introduces a trustee model where, like the NYSE example, a trustee can manage multiple domains on behalf of different grantors. When grantors under the same trustee transfer domains between themselves, they don't need to create new registrar accounts or provide CICV information repeatedly.

However, the present disclosure goes further than the NYSE analogy by using blockchain technology and smart contracts to completely decouple the transfer of beneficiary-ship from the CICV requirements. The DomainNFT smart contract acts as an immutable ledger of ownership, similar to how modern securities are tracked, but with the critical difference that ownership transfers can occur without pre-permission from registrars.

The grantor-trustee model in the invention allows the trustee to be the registered name holder while the actual beneficiary ownership is tracked through the blockchain. This enables instant transfers between parties using cryptographic signatures for authentication, while the trustee maintains compliance with regulatory requirements—creating a more efficient system than even modern securities trading.

The key innovation beyond the securities analogy is that the blockchain-based system allows for complete separation of ownership transfer from CICV requirements, while still maintaining the ability to enforce CICV when needed for domain management actions. This is fundamentally different from securities trading where the central authority (like NYSE) still requires identity verification for transfers.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method for facilitating efficient transfer of domain beneficiary-ship, the method comprising steps of:

providing a processor and a memory in communication with the processor, the memory including an identification and validation module employing asymmetric cryptography, a ledger module in communication with a blockchain, a data storage module, a database, and a domain modification request processing module in communication with a domain registry;

authenticating, by the identification and validation module, an identity of a request initiator via the asymmetric cryptography against a record maintained by the domain registry, and validating the record against a beneficiary identifier stored in the blockchain;

validating, by the identification and validation module, legitimacy of a request as recorded in the domain registry based on timing, sequence, and authority of the request initiator;

recording, by the ledger module, the beneficiary identifier of a current beneficiary for a specific domain name through a smart contract execution on the blockchain;

enabling, by the ledger module, direct transfers of beneficiary-ship between parties through the smart contract execution on the blockchain without requiring approval from domain registrars or registries;

storing, by the data storage module, resource record sets for a domain name in the database;

enforcing, by the data storage module, contractual or legal obligations requiring specific actions or information from a beneficiary before allowing modifications to the resource record sets in the database;

receiving, by the domain modification request processing module, modification requests from the request initiator when identified;

verifying, by the domain modification request processing module, request authenticity independently through the asymmetric cryptography against the blockchain;

confirming, by the domain modification request processing module, compliance with prerequisites for a modification to the resource record sets maintained in the database;

executing, by the domain modification request processing module, verified modifications upon completion of prerequisites to the resource record sets stored in the database; and facilitating beneficiary-ship transfers without requiring compliance verification for resource record set modifications, wherein a transfer of the beneficiary-ship is recorded on the blockchain through the smart contract execution by the ledger module independently of the modification to the resource record sets stored in the database.

2. The method of claim 1, wherein the ledger module with the blockchain enables bundling multiple domains into a single bundled asset that is transferrable.

3. The method of claim 2, wherein an entirety of the single bundled asset is transferable in a single transaction, and the blockchain ensures atomicity of the single bundled asset upon completion of domain transfers.

4. The method of claim 3, wherein a domain beneficiary-ship of one or more of the multiple domains is fractionalized into shares, each of the shares owned by one or more of the parties, which upon execution of the single transaction results in proportional distribution of proceeds to the parties.

5. The method of claim 4, wherein the parties can collectively authorize one or more of the domain transfers in the single transaction.

6. The method of claim 5, further comprising operating a marketplace for facilitating domain sales between buyers and sellers.

7. The method of claim 6, wherein the marketplace charges a facilitation fee.

8. The method of claim 1, further comprising a trustee serving as a registered name holder with the domain registry, wherein the beneficiary-ship includes a grantor tracked through the smart contract execution on the blockchain.

9. The method of claim 1, wherein verifying request authenticity further includes validating the request authenticity using a member selected from a group consisting of a nonce value, a timestamp, a blockchain chain identifier, and combinations thereof.

10. The method of claim 1, wherein storing the resource record sets further includes a private registration that masks ownership information for the domain name through a domain registrar proxy.

11. A system for facilitating efficient transfer of domain beneficiary-ship, the system comprising:

a processor; and a memory in communication with the processor, the memory including an identification and validation module employing asymmetric cryptography, a ledger module in communication with a blockchain, a data storage module, a database, and a domain modification request processing module in communication with a domain registry;

wherein:

the identification and validation module is configured to:

authenticate an identity of a request initiator via the asymmetric cryptography against a record maintained by the domain registry, and validate the record against a beneficiary identifier stored in the blockchain, and validate legitimacy of a request as recorded in the domain registry based on timing, sequence, and authority of the request initiator;

the ledger module is configured to:

record the beneficiary identifier of a current beneficiary for a specific domain name through a smart contract execution on the blockchain, and enable direct transfers of beneficiary-ship between parties through the smart contract execution on the blockchain without requiring approval from domain registrars or registries;

the data storage module is configured to:

store resource record sets for a domain name in the database, and enforce contractual or legal obligations requiring specific actions or information from a beneficiary before allowing modifications to the resource record sets in the database;

the domain modification request processing module is configured to:

receive modification requests from the request initiator when identified, verify request authenticity independently through the asymmetric cryptography against the blockchain, confirm compliance with prerequisites for a modification to the resource record sets maintained in the database, and execute verified modifications upon completion of prerequisites to the resource record sets stored in the database; and wherein the system is configured to facilitate beneficiary-ship transfers without requiring compliance verification for resource record set modifications and record the beneficiary-ship on the blockchain through the smart contract execution by the ledger module independently of the modification to the resource record sets stored in the database.

12. The system of claim 11, wherein the ledger module includes domain bundling functionality.

13. The system of claim 12, wherein the system supports fractionalized domain ownership with proportional proceeds distribution.

14. The system of claim 13, wherein the system enables multi-party authorization for domain transfers.

15. The system of claim 14, further comprising a marketplace module for facilitating domain transactions.

16. The system of claim 15, wherein the marketplace module includes fee processing functionality.

17. The system of claim 16, wherein the ledger module includes atomic transfers of bundled domains.

18. The system of claim 11, further comprising a trustee serving as a registered name holder with the domain registry, wherein the beneficiary-ship includes a grantor tracked through the smart contract execution on the blockchain.

19. The system of claim 11, wherein request authenticity verification by the domain modification request processing module further includes validation using a member of a group consisting of a nonce value, a timestamp, a blockchain chain identifier, and combinations thereof.

20. The system of claim 11, wherein the data storage module further includes a private registration that masks ownership information for the domain name through a domain registrar proxy.

* * * * *